United States Patent [19]

Hafner

[11] 4,211,202

[45] Jul. 8, 1980

[54] PUMP NOZZLE FOR AIR-COMPRESSING INJECTION INTERNAL COMBUSTION ENGINE

[75] Inventor: Günther Häfner, Stuttgart, Fed. Rep. of Germany

[73] Assignee: Daimler-Benz Aktiengesellschaft, Fed. Rep. of Germany

[21] Appl. No.: 942,162

[22] Filed: Sep. 14, 1978

[30] Foreign Application Priority Data

Sep. 21, 1977 [DE] Fed. Rep. of Germany ....... 2742466

[51] Int. Cl.² .................... F02M 57/02; F02M 39/00; B05B 1/30
[52] U.S. Cl. .................. 123/457; 123/472; 123/495; 123/467; 239/88; 239/96; 239/585
[58] Field of Search ..... 123/139 AK, 139 E, 139 AT, 123/139 AF, 139 DP; 239/88, 90, 93, 95, 96, 124, 127, 585

[56] References Cited

U.S. PATENT DOCUMENTS

| | | | |
|---|---|---|---|
| 2,984,230 | 5/1961 | Cummins | 123/139 AT |
| 3,606,158 | 11/1969 | Pritchard | 239/124 |
| 3,779,225 | 12/1973 | Watson | 123/139 E |
| 3,921,604 | 11/1975 | Links | 123/139 E |
| 3,952,711 | 4/1976 | Kimberley | 123/139 AT |
| 4,046,112 | 9/1977 | Deckard | 123/139 E |
| 4,069,800 | 1/1978 | Kanda | 123/139 E |
| 4,129,253 | 12/1978 | Bader | 123/139 E |

Primary Examiner—Charles J. Myhre
Assistant Examiner—Carl Stuart Miller
Attorney, Agent, or Firm—Craig & Antonelli

[57] ABSTRACT

A pump nozzle for an air-compressing injection internal combustion engine with a mechanically actuated pump piston and with an inlet bore connected with the pump working space, through which fuel is fed to a nozzle needle, as well as with a return bore for leakage oil and a control device influencing the fuel delivery; a valve which is actuated in the rhythm of the engine and which with an increasing fuel pressure separates the inlet line from the pump working space is arranged in the flow path of the inlet bore upstream of the pump working space, whereby the closing position of the valve is lifted by opening of a discharge bore leading to the return bore.

8 Claims, 1 Drawing Figure

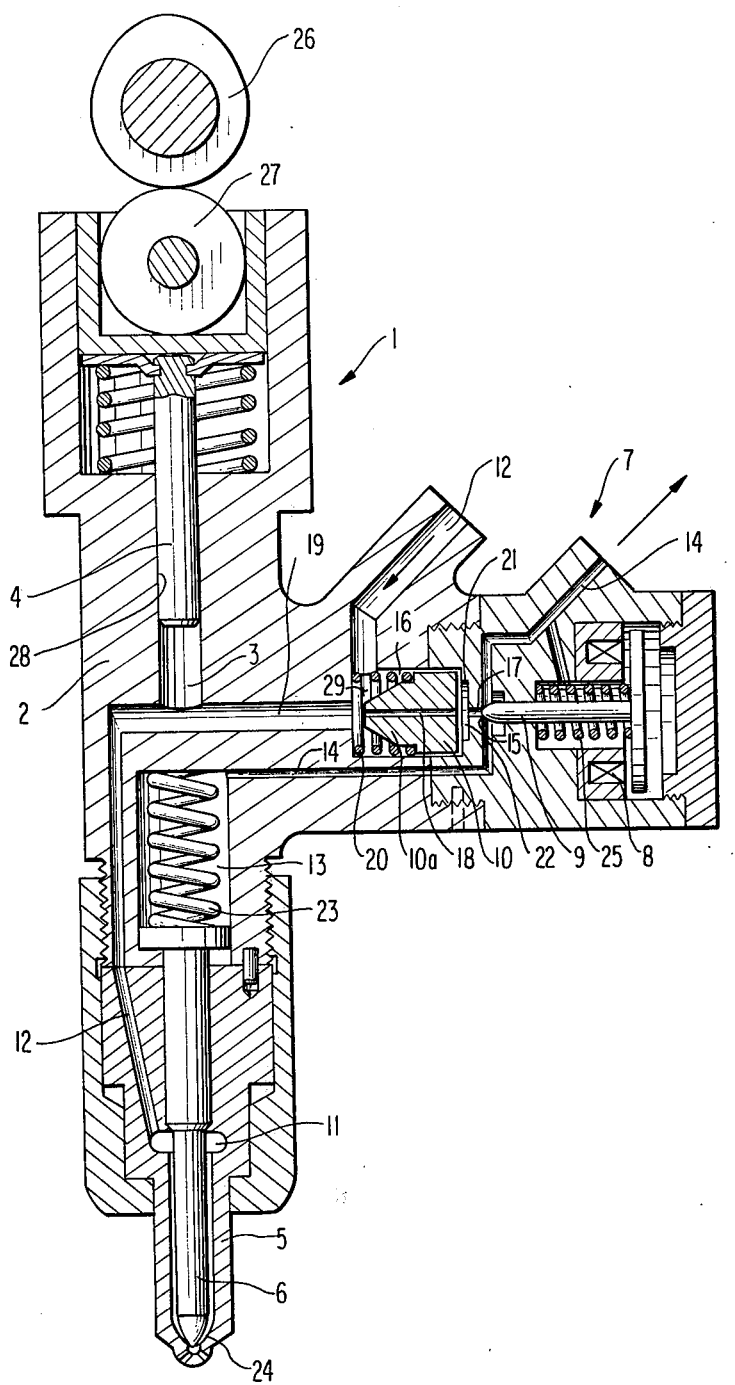

PUMP NOZZLE FOR AIR-COMPRESSING INJECTION INTERNAL COMBUSTION ENGINE

The present invention relates to a pump nozzle for air-compressing injection internal combustion engines with a mechanically actuated pump piston delimiting a pump working space and with an inlet bore connected with the pump working space, through which fuel is fed to a nozzle pin or nozzle needle arranged in the nozzle body, as well as with a return bore provided for leakage oil and with a control mechanism influencing the fuel delivery.

In a known pump nozzle of this type (German Offenlegungsschrift 19 07 316) a control unit driven by a transmission of an engine controls the injection timing adjustment and the duration of the injected fuel quantity by means of pressure signals transmitted to the pump nozzle. With this construction the dead-time resulting from the long feed respectively control lines between the control unit and the individual injection mechanisms has to be compensated for by increased technical expenditures for purposes of an accurate injection-time adjustment.

Furthermore, a pump nozzle is known in the prior art (German Offenlegungsschrift 2 012 202), in which a controllable solenoid valve controls the fuel flow to the pump piston. It is thereby disadvantageous that the feed system is under high pressure, namely the feedlines and the inlet bores of the pump nozzle. As a result of the high inlet pressure, special seals as well as cushions or dash pots are necessary for smoothing out the pressure fluctuations.

The present invention is concerned with the task to provide, compared to these prior art pump nozzle arrangements, a mechanically actuated pump nozzle with an electromagnetically controlled feed beginning and feed end, which enables with fast running diesel engines a noise-reducing feed beginning as well as a feed end reducing the soot formation.

The underlying problems are solved according to the present invention in that a valve actuated in the rhythm or timing of the engine and with an increasing fuel pressure separating the inlet bore from the pump working space is arranged in the flow path of the inlet bore upstream of the pump working space, whose closing position is lifted by opening of a discharge bore leading into the return bore.

Furthermore, provision is made according to the present invention in that in an open valve position, the forward part of the valve facing the closing direction projects into the inlet bore in a cross-section reducing manner.

As a further feature of the present invention, the valve is longitudinally displaceably guided in a chamber and is provided with an uninterrupted throttle bore, which with an opened discharge bore connects the inlet bore with the return bore by way of the discharge bore.

In a preferred embodiment of the present invention, a pilot control valve cooperating with an electromagnet and controlling the valve may be provided for closing the discharge bore.

In order to obtain a definite position of the valve, a coil spring retaining the valve in the starting position is provided.

Accordingly, it is an object of the present invention to provide a pump nozzle for air-compressing injection internal combustion engines, which avoids by simple means the aforementioned shortcomings and drawbacks encountered in the prior art.

Another object of the present invention resides in a pump nozzle for air-compressing injection internal combustion engines, which obviates the need of costly technical measures to compensate for any dead time in the control system.

A further object of the present invention resides in a pump nozzle for air-compressing injection internal combustion engines, in which special seals as well as means for smoothing out pressure fluctuations are unnecessary.

Still another object of the present invention resides in a pump nozzle of the type described above which enables a noise-reduction at the beginning of the delivery of the fuel as well as a reduction of the soot formation at the end of the fuel delivery.

A further object of the present invention resides in a pump nozzle for air-compressing injection internal combustion engines, which utilizes relatively few parts and can be easily manufactured and installed, yet assures a high reliability in the operation thereof.

These and other objects, features and advantages of the present invention will become more apparent from the following description when taken in connection with the accompanying drawing which shows, for purposes of illustration only, one embodiment in accordance with the present invention, and wherein:

The single FIGURE is a cross-sectional view through a pump nozzle for air-compressing injection internal combustion engines in accordance with the present invention.

Referring now to the single FIGURE of the drawing, a pump nozzle generally designated by reference numeral 1 which is provided for the direct injection, essentially consists of a pump piston 4 accommodated in a pump body 2 and producing the high pressure in the pump working space 3, and of a nozzle needle or nozzle pin 6 guided in the nozzle body 5.

A control mechanism generally designated by reference numeral 7 projects from the pump body 2, which accommodates both an electromagnet 8 with a pilot control valve 9 as also a cylindrically shaped valve 10 influenceable by the position of the pilot control valve 9, whereby the conically constructed front face 10a of the valve 10 projects in a cross-section-reducing manner into an inlet bore 12 leading to the nozzle space 11 by way of the pump working space 3, and more particularly into a section 19 of the inlet bore 12 disposed ahead of the pump working space 3, whereas the pilot control valve 9 during energization of the electromagnet 8 closes off at a place 15 a discharge bore 17 terminating in a return bore 14 which branches off from the spring space 13. The valve 10 which is longitudinally displaceably guided in a chamber 16, includes an uninterrupted throttle bore 18, which in the nonclosed position of the valve 10 connects the inlet bore 12 with the return bore 14 by way of the discharge bore 17.

The discharge bore 17, the throttle bore 18 and the section 19 of the inlet bore 12 which is located ahead of the valve 10 and which leads to the pump working space 3, are all disposed coaxially to one another With a non-closed discharge bore 17, the valve 10—assisted by the force of a coil spring 20—abuts at a ring-shaped abutment 21 in the rear chamber part 22 of the chamber 16. In this position which illustrates the normal, rest respectively starting position of the valve 10, a part of the conically constructed front face 10a is disposed in the flow path of the inlet bore 12. The front face 10a is so constructed and designed in its size that it projects partly into the section 19 of the inlet bore 12 in the closed position of the valve 10.

OPERATION

The operation of this pump nozzle arrangement is as follows:

The nozzle needle 6 rests on its valve seat 24 as a result of the force of a coil spring 23 arranged in the spring space 13. An inlet pressure of about 2 bar prevails in the inlet bore 12 leading to the nozzle space 11, which retains the valve 10 in the chamber 16 in the open position. The weak coil spring 20 is provided for the definite position of this valve which as also the inlet pressure presses the valve 10 against the ring shaped abutment 21. In this position of the valve 10 a small partial stream flows from the inlet bore 12 into the throttle bore 18 of the valve 10, into the chamber part 22 and finally by way of the discharge bore 17 into the return bore 14 since a return spring 25 keeps the pilot control valve 9 open in the non-energized condition of the electromagnet 8 which is controllable by an electronic control apparatus (not shown) actuated in the rhythm of the engine. Since the electronic control apparatus utilizes known electronic circuits, forming no part of the present invention, a detailed description thereof is dispensed with herein. The chamber part 22 disposed to the rear of the valve 10 is thus pressure-relieved.

The pump piston 4 driven by way of a cam shaft and roller shaft 27, which is not provided either with control edges or with control holes and in connection with which an easy rotatability in the cylinder 28 also is not required, is disposed—as shown—in the uppermost position.

If now the electromagnet 8 is energized during the pump stroke of the pump piston 4 and the pilot valve 9 is closed—the return in the discharge bore 17 is interrupted—, the fuel quantity reaching the chamber part 22 can no longer flow off and a pressure builds up there at of the magnitude of the pressure head in the section 19 of the inlet bore 12.

As a result of the difference of the effective areas at the valve 10, the latter moves in the closing direction, whereby the feed quantity displaced by the pump piston 4 is ever more throttled at a place 29.

The pressure increases which sets in the pump working space 3 effects by way of the throttle bore 18 in the valve 10 a reinforcement of the closing movement of the valve 10 up to the complete closure thereof. The abutment of the valve 10 is the stronger, the higher the pump pressure. The delivered fuel is now injected at a high pressure (300–800 bar) by way of the nozzle needle 6 which now lifts off from the valve seat 24 against the force of the spring 23.

The delivery end is initiated by the opening of the pilot valve 9 after the discontinuation of the energization of the electromagnet 8. As a result of the relief of the chamber part 22, an immediate opening of the valve and therewith a relief of the pump working space 3 is achieved. The nozzle needle 6 closes and terminates the injection.

The points in time of the feed beginning and of the feed end are determined by the electronic control apparatus controlling the electromagnet 8.

By appropriate selection of the throttle bore 18 in the valve 10, a delayed pressure build-up in the pump working space 3 as well as a very rapid pressure drop are achieved, whence the injection principle is favorably influenceable with a view toward a soft pressure increase during the combustion as well as toward a reduced soot formation.

While I have shown and described only one embodiment in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

I claim:

1. A pump nozzle for an air-compressing internal combustion engine, the pump nozzle including a nozzle body means, a nozzle needle arranged in the nozzle body means, a mechanically actuated pump piston means for delimiting a pump working space, an inlet bore means operatively connected with the pump working space for feeding fuel to the nozzle needle, return bore means for returning leakage fuel, and a control means for influencing a delivery of fuel by the pump nozzle, characterized in that a discharge bore means communicates with the return bore means, the control means includes a valve means longitudinally displaceably guided in a chamber means arranged in a flow path of the inlet bore means at a position upstream of the pump working space for controlling a pressure of fuel in the pump working space, means are provided for actuating said valve means in accordance with a rhythm of the engine and for controlling an opening of the discharge bore means so that, with an increase in fuel pressure, said valve means is displaced into a closed position separating the inlet bore means from the pump working space, said control means are operable to displace the valve means to an open position by opening of the discharge bore means, and in that a substantially uninterrupted throttle bore is provided in the valve means for operatively connecting the inlet bore means with the return bore means by way of the discharge bore means when said discharge bore means is open, and in that the valve means includes a forward part which projects into the inlet bore means in a cross-section-reducing manner when the valve means is in the open position.

2. A pump nozzle according to claim 1, characterized in that said actuating means includes a pilot control valve means for controlling the valve means and the opening of the discharge bore means, and an electromagnet means is operatively connected with the pilot control valve means for controlling an operation thereof.

3. A pump nozzle according to claim 2, characterized in that a coil means is provided for retaining the valve means in a starting position.

4. A pump nozzle for an air-compressing internal combustion engine, the pump nozzle including a nozzle body means, a nozzle needle arranged in the nozzle body means, a mechanically actuated pump piston means for delimiting a pump working space, an inlet bore means operatively connected with the pump working space for feeding fuel to the nozzle needle, return bore means for returning leakage fuel, and a control means for influencing a delivery of fuel by the pump nozzle, characterized in that a discharge bore means communicates with the return bore means, the control means includes a valve means longitudinally displaceably guided in a chamber means arranged in a flow path of the inlet bore means at a position upstream of the pump working space for controlling a pressure of fuel in the pump working space, means are provided for actuating said valve means in accordance with a rhythm of the engine and for controlling an opening of the discharge bore means so that, with an increase in fuel pressure, said valve means is displaced into a closed position separating the inlet bore means from the pump working space, said control means are operable to displace the valve means to an open position by opening of the discharge bore means, and in that a substantially uninterrupted throttle bore is provided in the valve means for operatively connecting the inlet bore means with the return bore means by way of the discharge bore means when said discharge bore means is open.

5. A pump nozzle according to claim 4, characterized in that said actuating means includes a pilot control valve means for controlling the valve means and the opening of the discharge bore means, and an electromagnet means is operatively connected with the pilot control valve means for controlling an operation thereof.

6. A pump nozzle according to claim 5, characterized in that a coil spring means is provided for retaining the valve means in starting position.

7. A pump nozzle according to claim 6, characterized in that a coil spring means is provided for retaining the valve means in starting position.

8. A pump nozzle according to claim 7, characterized in that the valve means includes a forward part which projects into the inlet bore means in a cross-section-reducing manner when the valve means is in an open position.

* * * * *